United States Patent [19]

Kobayashi et al.

[11] Patent Number: 4,874,302
[45] Date of Patent: Oct. 17, 1989

[54] SCROLL COMPRESSOR WITH OIL FEEDING PASSAGES IN THRUST BEARING

[75] Inventors: Norihide Kobayashi; Tsutomu Inaba; Tadashi Kimura; Masahiro Sugihara, all of Wakayama, Japan

[73] Assignee: Mitsubishi Denki Kabushiki Kaisha, Tokyo, Japan

[21] Appl. No.: 216,309

[22] Filed: Jul. 8, 1988

[30] Foreign Application Priority Data

Jul. 8, 1987 [JP] Japan ................... 62-171590

[51] Int. Cl.⁴ .................. F04C 18/04; F04C 29/02; F16C 33/10
[52] U.S. Cl. ......................... 418/55; 384/369
[58] Field of Search ............ 418/55 B, 55 E, 94; 384/369

[56] References Cited

U.S. PATENT DOCUMENTS

| 4,065,279 | 12/1977 | McCullough | 418/55 E |
| 4,734,020 | 3/1988 | Inaba et al. | 418/55 E |
| 4,772,188 | 9/1988 | Kimura et al. | 418/55 E |

FOREIGN PATENT DOCUMENTS

| 60-265375 | 11/1986 | Japan | 418/55 E |
| 300129 | 9/1954 | Switzerland | 384/369 |

*Primary Examiner*—John J. Vrablik
*Attorney, Agent, or Firm*—Oblon, Spivak, McClelland, Maier & Neustadt

[57] ABSTRACT

A scroll type compressor, wherein the oil feeding passage of the thrust bearing to be interposed between the orbiting scroll member and the bearing support is so constructed as to having its terminal part within a plane of the thrust bearing, and a part of each of the passages is made to open at a position where it is intermittently communicating with the guide grooves of the orbiting scroll member.

5 Claims, 7 Drawing Sheets

SCROLL COMPRESSOR WITH OIL FEEDING PASSAGES IN THRUST BEARING

BACKGROUND OF THE INVENTION

1. Field of the Invention

This invention relates to a scroll compressor for compressing refrigerant or air in, for example, referigerators, air conditioners, and so forth.

2. Discussion of Background

Figure 9:
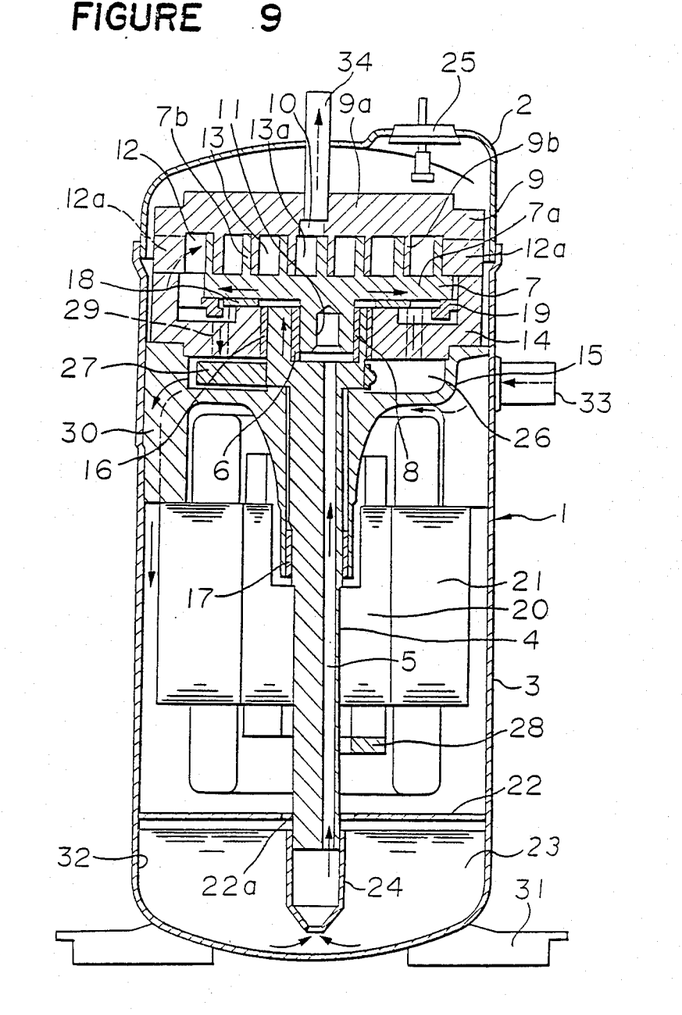
FIG. 9 is a side elevational view, partly in longitudinal cross-section showing a conventional scroll type compressor.

This type of scroll compressor is disclosed in Japanese Patent Application No. 64571/1984, which is in such a construction as shown in FIG. 9 of the accompanying drawing.

Explaining this scroll compressor in reference to the drawing, it is constructed with a casing 1 for the scroll compressor, which comprises an upper shell 2 and a lower shell 3; a main shaft 4 provided in the interior of the casing 1 and having therein an oil-feeding passage 5 and an eccentric hole 6; an orbiting scroll member 7 which is supported in the eccentric hole 6 of the main shaft 4 through an orbiting bearing member 8, and is provided with a scroll end plate 7a and a spiral wrap 7b; and a stationary scroll member 9 to be assembled with the orbiting scroll member 7, and having a scroll end plate 9a and a scroll wrap 9b. In the scroll end plate 9a of this stationary scroll 9, there is formed an outlet pocket 10 opening in the axial direction. An orbiting shaft 11 is integrally fitted in the above-mentioned eccentric hole 6 formed in the scroll end plate 7a of the above-mentioned orbiting scroll 7. Between both orbiting scroll 7 and stationary scroll 9, there are formed an inlet chamber 12 having an inlet port 12a for sucking fluid in the above-mentioned casing 1 and a compression chamber 13 having the innermost (or central) pocket 13a communicatively connected with the above-mentioned outlet pocket 10. Reference numerals 14 and 15 designate respectively an upper bearing support and a lower bearing support; a numeral 18 refers to a thrust bearing which is installed on the upper bearing support 14 out of the two bearing supports 14, 15 to hold thereon the above-mentioned orbiting scroll member 7; a numeral 19 refers to an Oldham coupling which is disposed around this thrust bearing 18 to prevent the orbiting scroll member 7 from its rotation and cause it to perform revolution, i.e., orbiting movement; a reference numeral 20 denotes a motor rotor which is housed in the interior of the above-mentioned casing 1 and fixed on and around the above-mentioned main shaft 4; a reference numeral 21 represents a motor stator which is provided around the motor rotor 20 and fixed on the above-mentioned lower bearing support 15; a reference numeral 22 designates a shielding plate which is disposed below the motor stator 21 and has a hole 22a formed therein to permit passage of the main shaft 4 therethrough; a numeral 23 refers to lubricating oil stored below this shielding plate 22; a reference numeral 24 designates a cylindrical cap member for an oil pump, which is fitted at the extreme end of the main shaft 4 and immersed in the lubricating oil 23; a numeral 25 refers to a glass terminal which is fixed on the upper shell 2 and to which a lead wire (not shown in the drawing) from the motor stator 21 is connected; a numeral 26 is a balancer chamber defined in the lower-bearing support; a numeral 27 refers to a first balancer accommodated in this balancer chamber 26 and fixed on the main shaft 4; a numeral 28 refers to a second balancer which is provided below the first balancer 27 and fixed on the motor rotor 20; reference numerals 29 and 30 are respectively oil returning passageways formed in the upper bearing support 14 and the lower bearing support 15, and opening in the axial direction; 31 denotes legs for holding firmly the overall compressor; 32 designates an oil sump, and 33, 34 denote respectively an inlet tube and an outlet tube.

In the scroll type compressor of the above-described construction, when the main shaft 4 starts to rotate by electric conduction through the motor stator 21, the rotational force of this main shaft is transmitted to the orbiting scroll member 7 through the orbiting bearing 8, whereby this orbiting scroll member 7 moves, while maintaining a certain definite angular posture with respect to the upper bearing support 14. During this movement of the orbiting scroll member 7, compression of fluid is effected in the compression chamber 13, whereby the fluid is introduced into the casing 1 from the inlet tube 33, as shown by an arrow in dash, to cool the upper part of the motor stator 21, after which it passes through the outer peripheral passage (not shown in the drawing) of the upper bearing support 14, and is discharged outside the casing 1 from the outlet tube 34 by way of the inlet port 12a, the inlet chamber 12, the compression chamber 13 and the outlet pocket 10. At this instant, the lubricating oil 23 in the casing 1 is sucked in through the cylindrical cap member 24 due to the centrifugal force caused by rotation of the main shaft 4, is elevated in and through the oil feeding passage 5, and is fed to the orbiting bearing 8 and the main bearing 16. Thereafter, this lubricating oil 23 passes through an oil feeding groove (not shown in FIG. 9) of the thrust bearing 18 and discharged outside in the radial direction from the center of the thrust bearing 18, and is returned to the oil sump 32 situated below the shielding plate 22 through the oil returning passage 29, the balancer chamber 26, the oil returning passage 30, and the hole 22a. In this case, since a gap between the scroll end plate 7a and the Oldham coupling 19 is set in a minute size, any outflow of the lubricating oil 23 through this gap into the inlet chamber 12 can be prevented.

Figures 10, 11:
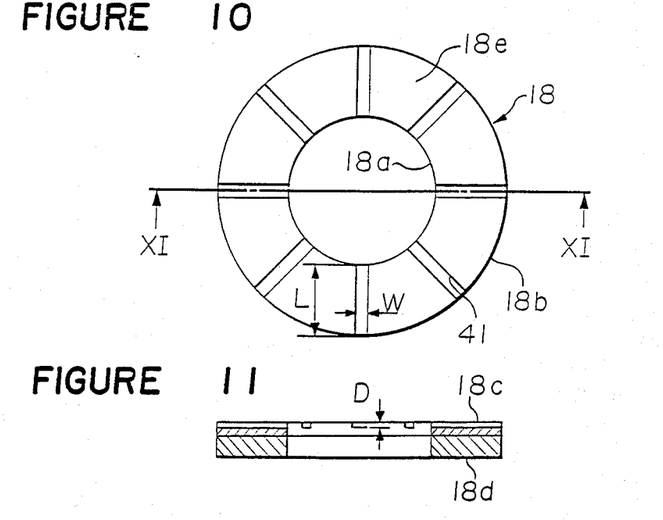
FIG. 10 is a schematic plan view of a conventional thrust bearing.
FIG. 11 is a cross-sectional view taken along a line XI—XI in FIG. 10.
Figure 12:
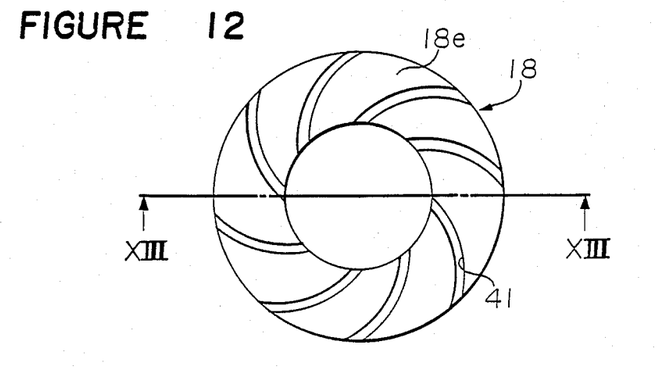
FIG. 12 is also a schematic plan view of a conventional thrust bearing.
Figure 13:
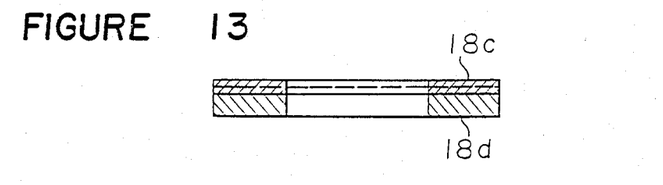
FIG. 13 is a cross-sectional view taken along a line XIII—XIII in FIG. 12.

By the way, there are two ways of forming the oil feeding passages (or grooves) 41 in the thrust bearing 18: the one is a radial type as shown in FIGS. 10 and 11, wherein the oil feeding passages are formed radially to extend from the inner peripheral edge 18a to the outer peripheral edge 18b; and the other is an involute type as shown in FIGS. 12 and 13, wherein the oil feeding passages are formed as such. The thrust bearing 18 as a whole is constructed with a bearing layer 18c made of aluminum alloy, PTFE (polytetrafluoroethylene resin) and others, and a metal lining layer 18d made of rolled steel plate to support the bearing layer 18c. It is a usual practice to form the oil feeding passages 41 by press-forming, in case the thrust bearing 18 is made of aluminum alloy, and the depth D of the passage ranges from 0.3 to 0.6 mm. When the thrust bearing 18 is made of aluminum alloy and the depth D of the oil feeding passage is deeper than 0.6 mm, or when the thrust bearing is made of PTFE, it is a usual practice to form the passages by cutting work.

On the contrary, when the depth D of the oil feeding passage 41 is smaller than 0.6 mm (that is, when the grooves 41 are to be formed by the press-forming), it has been done generally to enlarge the breadth W of the oil feeding passage, or shorten the length L of the passage, or reduce the number N thereof, taking into consideration easy flow of the lubricating oil 23 in and through the oil feeding passages 41. On account of such designing of the oil feeding grooves, there has been a problem such that the effective area of the bearing part 18e of the thrust bearing 18 becomes smaller, which in turn increases the load to be imposed on the unit area of the bearing part to thereby cause abnormal wear and burning of the bearing part 18e.

In the case of forming the oil feeding passage 41 by the cutting work, the depth D of the groove can be arbitrarily determined, which, however, brings about inconveniences such that the arbitarary setting of the depth not only makes the machining work complicated, but also it causes deformation in the thrust bearing 18 due to the machining work.

Figure 14:
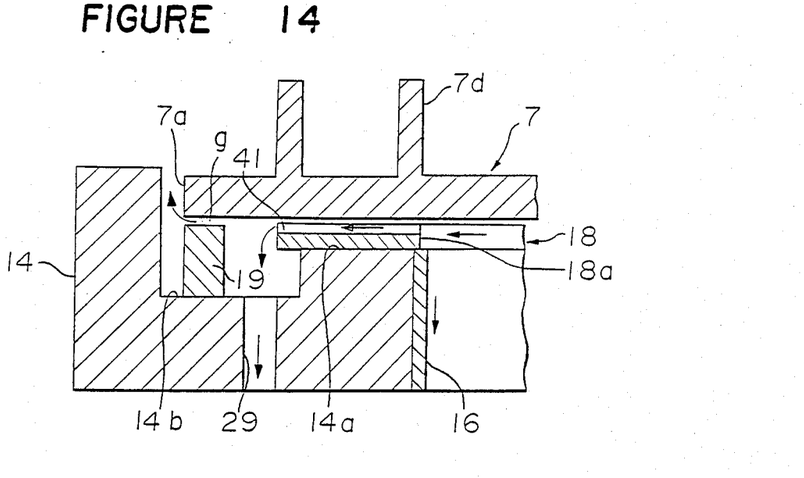
FIG. 14 is an enlarged cross-sectional view showing a feeding state of lubricating oil.

Further, in the conventional scroll type compressor, the gap between the scroll end plate 7a and the Oldham coupling 19 should be set in a minute size with a view to inhibiting flow of the lubricating oil 23 out into the inlet chamber 12 as shown in FIG. 14 of the accompanying drawing, on account of which the plate thickness of the thrust bearing 18 and the Oldham coupling 19 needs to be established in a precise dimension. In addition, the flatness of a thrust bearing fitting surface 14a and an Oldham coupling sliding surface 14b of the upper bearing support 14 as well as a sliding surface of the Oldham coupling 19 (not shown in the drawing) should be rendered with high precision, which makes the machining work complicated and results in high production cost. For example, if the minute clearance g is set in a size of 70 μm or so, the oil circulating quantity (i.e., a ratio of a weight of the lubricating oil discharged outside the casing 1 from the outlet tube 34 to a weight of refrigerant during circulation of the refrigerant during the operation of the scroll type compressor) can be set below 1% as a permissible circulating quantity.

Figure 15:
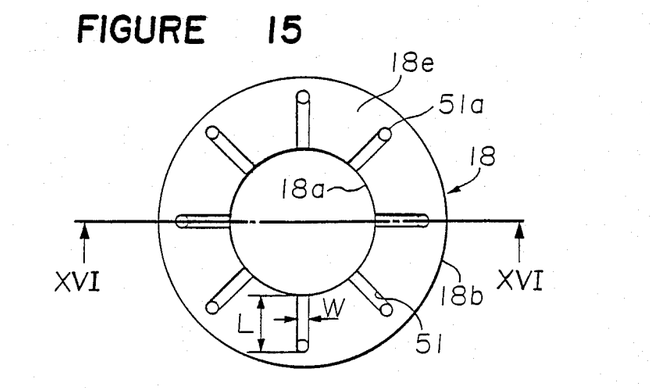
FIG. 15 is a plan view showing a conventional thrust bearing.
Figure 16:
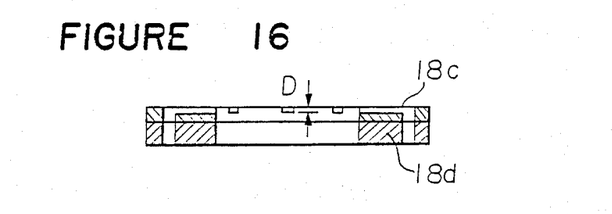
FIG. 16 is a cross-sectional view taken along a line XVI—XVI in FIG. 15.
Figure 17:
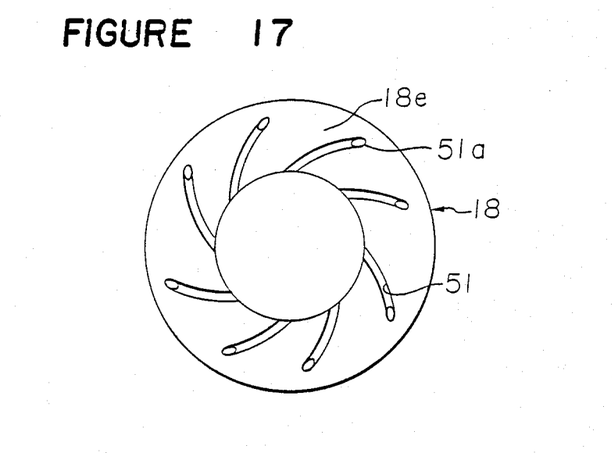
FIG. 17 is also a plan view of a conventional thrust bearing.
Figure 18:
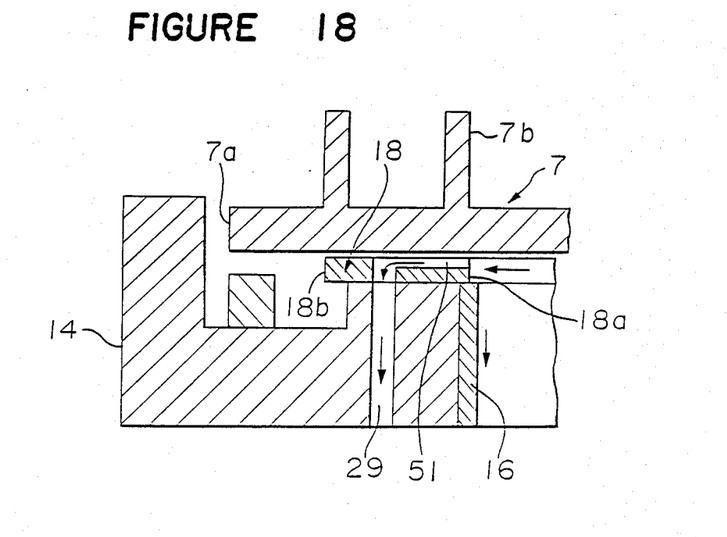
FIG. 18 is an enlarged cross-sectional view showing a feeding state of lubricating oil.

The conventional scroll type compressor, therefore, has adopted a design as shown in FIGS. 15, 16 and 17 of the accompanying drawing, wherein oil feeding passages 51, each having a terminal part 51a, are formed in the thrust bearing 18, and a part of this oil feeding passage 51 is communicatively connected to the oil returning passage 29 of the upper bearing support 14 so as to fill a space between the scroll end plate 7a and the thrust bearing 18 with the lubricating oil 23 as shown in FIG. 18, thereby establishing the oil circulating quantity to be 1% or below.

In this type of scroll compressor, however, since the construction in such that the oil feeding passage 51 is closed by its terminal part 51a, the quantity of the lubricating oil 23 to flow out in the radial direction of the thurust bearing 18 becomes extremely small with the consequence that the oil feeding quantity to the Oldham coupling sliding groove of the orbiting scroll member 7 and to the Oldham coupling sliding part of the upper bearing support 14 reduces considerably, which tends to cause rapid wear of the Oldham coupling 19.

SUMMARY OF THE INVENTION

The present invention has been made with a view to solving these various problems inherent in the conventional scroll type compressors, and aims at providing an improved scroll type compressor which is capable of securing lubrication of the sliding part of the Oldham coupling, hence capable of remarkably suppressing wear of the Oldham coupling.

According to the present invention, in general aspect of it, there is provided a scroll type compressor which comprises, in combination: a bearing support having guide grooves extending in the diametral direction and an oil returning passage opening in the axial direction; a stationary scroll member having a spiral wrap and fixed on said bearing support; an orbiting scroll member having a spiral wrap which is combined with the spiral wrap of said stationary scroll member and guide grooves extending in the direction perpendicular to the direction of extension of said guide grooves; an annular thrust bearing interposed between said orbiting scroll member and said bearing support, and having a multitude of oil feeding passages, each communicatively connected with said oil returning passage; and an Oldham coupling disposed on and around said thrust bearing and having claws which slide in and along said both guide grooves, wherein said each oil feeding passage is so formed as to having a terminal part within a plane of said thrust bearing, and a part of the passage is made to open at a position where it is intermittently communicating with said guide groove of said orbiting scroll member.

As summarised above, the scroll type compressor according to the present invention constructs each of the oil feeding passages of the thrust bearing, which is to be interposed between the orbiting scroll member and the bearing support, in a manner to have the terminal part within a plane of the thrust bearing, and a part of each of the passages is made to open at a position where it is intermittently communicating with the guide groove of the orbiting scroll member, whereby lubricating oil can be fed into the guide grooves of the orbiting scroll member through the oil feeding passages of the thrust bearing.

The foregoing object, other objects as well as specific construction and function of the scroll type compressor according to the present invention will become more apparent and understandable from the following detailed description thereof, when read in conjunction with the accompanying drawing.

DETAILED DESCRIPTION OF PREFERRED EMBODIMENT

Figure 1:
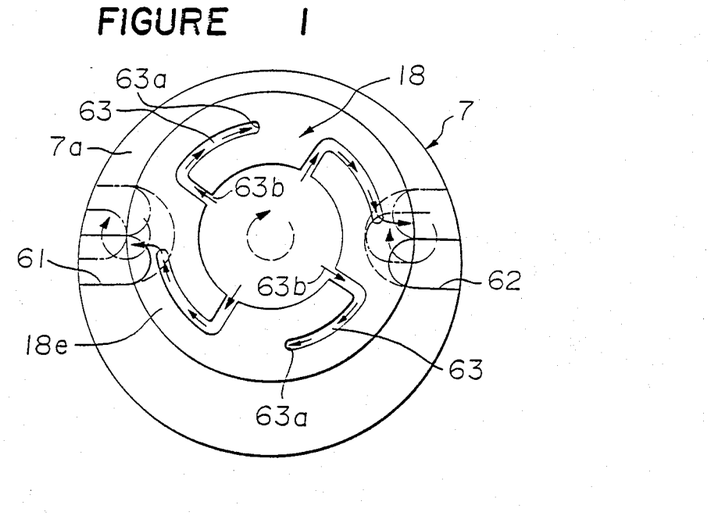
FIGS. 1 and 2 are respectively a top plan view and an exploded perspective view showing the main part of the scroll type compressor according to the first embodiment of the present invention.
Figure 2:
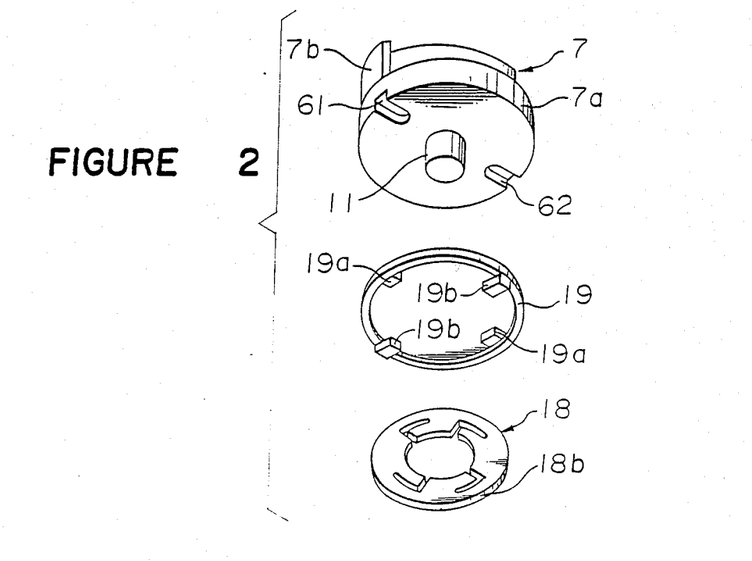
Figure 3:
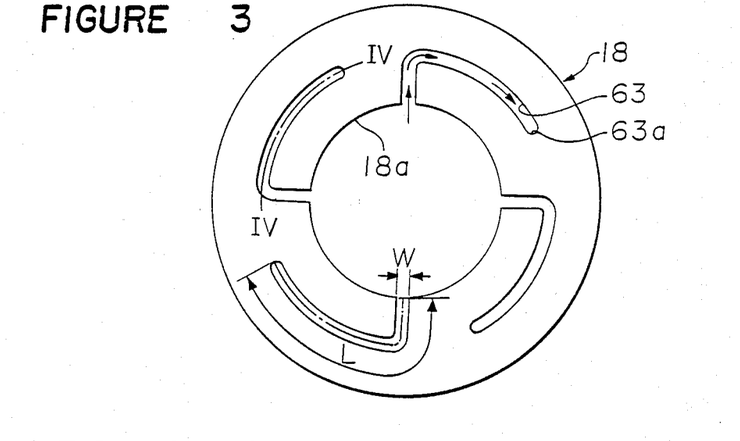
FIG. 3 is a plan view showing the thrust bearing.
Figure 4:
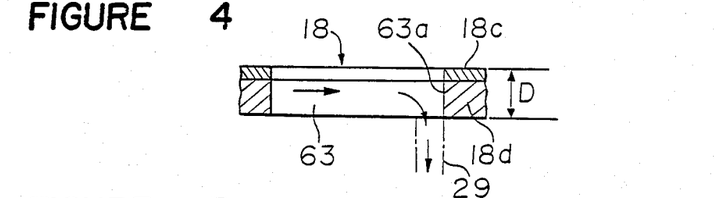
FIG. 4 is a cross-sectional view taken along a line IV—IV in FIG. 3.
Figure 5:
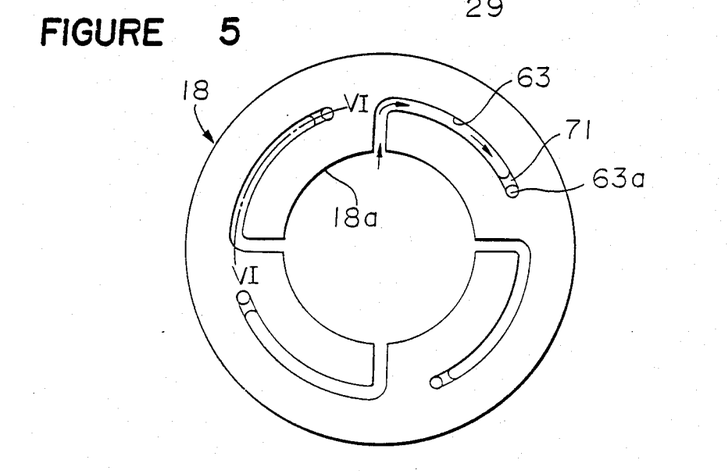
FIG. 5 is also a plan view showing the thrust bearing according to the second embodiment of the present invention.

In the following the scroll type compressor according to the present invention will be described in detail in reference to the accompanying drawing. FIGS. 1 and 2 are respectively a plan view and an exploded perspective view of the main part of the scroll type compressor according to the present invention, and FIGS. 3 and 4 are respectively a plan view and a cross-sectional view of the thrust bearing used in such scroll type compressor. In these figures of the drawing, the same constituent members as those in FIGS. 9 to 18 are designated by the same reference numerals, and any detailed description thereof will be dispensed with.

Referring to FIGS. 1 to 4, reference numerals 61 and 62 designate guide grooves which extend in the direction perpendicular to both guide grooves 14b of the above-mentioned upper bearing support 14, the guide grooves 61 and 62 being provided at the backside of the scroll end plate 7a of the orbiting scroll member 7. A numeral 63 refers to a multitude of oil feeding passages, each of which is open in the axial direction of the main shaft 4 in communication with the oil returning passage 29 of the upper bearing support 14, and is formed by the pressing work. The oil feeding passage has its terminal part 63a within a plane of the thrust bearing and is constructed in the form of a bent slit 63 which opens to the center of the thrust bearing and which has a substantially circumferentially extending part, within which is positioned the terminal port 63a. This oil feeding passage is so established that its depth D is uniform and equal to a plate thickness t, its width W satisfies a relationship of $W \geq 1.5 \times D$, and its length is in an arbitrary value. A part of this oil feeding passage is open at a position where it intermittently communicates with the guide grooves 61, 62 of the orbiting scroll member 7. Incidentally, the guide grooves 61, 62 of the orbiting scroll member 7 and the guide grooves 14b of the upper bearing support 14 are positioned on a straight line passing through the center of a circle.

In the scroll type compressor of such construction, the lubricating oil 23 flows through the oil feeding passages 63 from inner open parts 63b during the compressor operation, and then it is returned into the casing 1 situated below the shielding plate 22 from the neighborhood of the terminal part of the oil feeding passage through the oil returning passage 29 in the upper bearing support 14, the balancer chamber 26, the oil returning passage 30 in the lower bearing support 15, and the hole 22a.

At this instant, the lubricating oil 23 can be fed intermittently into the guide grooves 61, 62 of the orbiting scroll member 7 from the oil feeding passages 63 of the thrust bearing 18 as indicated by an arrow in solid in FIG. 4. As the consequence of this, it becomes possible to lubricate without failure the claws 19a, 19b of the Oldham coupling 19, which slide in and along the guide grooves 14b of the upper bearing support 14 and the guide grooves 61, 62 of the orbiting scroll member 7, and, at the same time, to control the oil circulating quantity within its permissible range. Incidentally, an arrow in dash as shown in FIG. 1 denotes the orbiting direction of the orbiting scroll member 7.

Further, in this embodiment, the oil feeding passages 63 are formed by the pressing work, on account of which the machining work can be done simply.

Furthermore, in this embodiment, since the oil feeding passages 63 are made in a slit form, any abnormal wear and burning of the thrust bearing 18 at its bearing part 18e can be prevented from occuring. In this case, width W, length L and number N of the oil feeding passage 63 to be formed may be determined on the basis of the feeding quantity of the lubricating oil 23 with respect to the orbiting bearing 8 and the main bearings 16 and 17.

Moreover, since the oil feeding passage 63 is so constructed that it may be closed at its terminal part 63a, undersirable outflow of the lubricating oil 23 into the inlet chamber 12 can be prevented. Accordingly, there is no longer necessity for setting the gap between the scroll end plate 7a and the Oldham coupling 19 in a minute size, hence there is no necessity for setting the plate thickness of the thrust bearing 18 and the Oldham coupling 19 in a highly precise dimension, nor necessity for rendering the flatness of the thrust bearing fitting surface 14a and the Oldham coupling sliding surface 14b of the upper bearing support 14 as well as the sliding surface (not shown in the drawing) of the Oldham coupling to be highly precise, with the consequence that the machining work can be done simply and at a reduced manufacturing cost.

Figure 6:
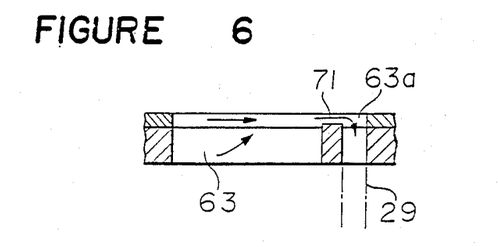
FIG. 6 is a cross-sectional view taken along a line VI—VI in FIG. 5.
Figure 7:
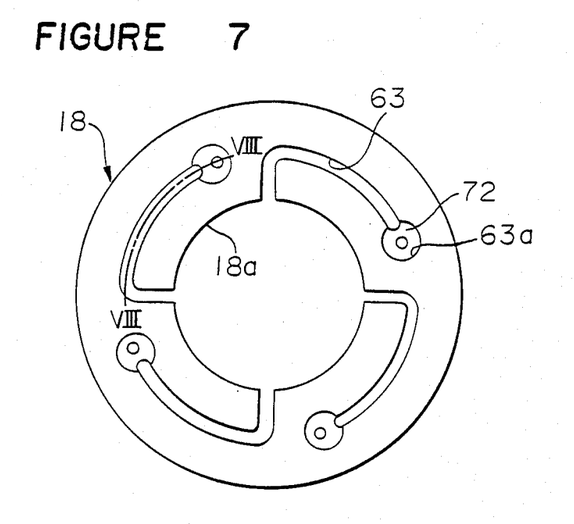
FIG. 7 is a plan view showing the thrust bearing according to the third embodiment of the present invention.
Figure 8:
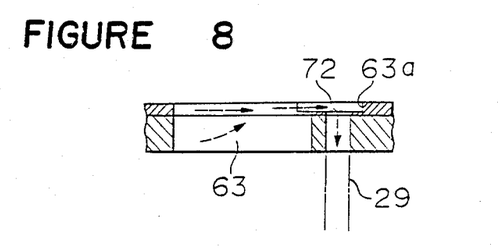
FIG. 8 is a cross-sectional view taken along a line VIII—VIII in FIG. 7.

According to the preferred embodiments of the present invention, the depth D of the oil feeding passage 63 is shown to be uniform throughout, but the invention is not limited to this embodiment alone and a throttle part 71, 72 may be provided as shown in FIGS. 6, 7 and 8 which are otherwise identical to the embodiment of FIGS. 1–5. The reason for this is that, in the oil feeding system adopting the function of the centrifugal pump, there is an apprehension of the feeding quantity of the lubricating oil to the thrust bearing 18 being reduced during a low speed rotation of the inverter, hence it is required to control the oil feeding quantity.

As has so far been mentioned in the foregoing, the scroll type compressor according to the present invention is so constructed that the oil feeding passages in the thrust bearing, which is to be interposed between the orbiting scroll member and the bearing support, is provided with the terminal part for each of them within a plane of the thrust bearing, and a part of the passage is made to open at a position where it is intermittently communicating with the guide grooves of the orbiting scroll member with the result that the lubricating oil can be fed into the guide grooves of the orbiting scroll member from the oil feeding passage of the thrust bearing. Accordingly, the sliding part of the Oldham coupling can be lubricated without failure, hence undesirable wear thereof can be suppressed remarkably.

Although, in the foregoing, the present invention has been described with particular reference to the preferred embodiments thereof, it should be noted that the invention is not limited to these embodiments alone, but any changes and modifications may be made by those persons skilled in the art without departing from the spirit and scope of the invention as recited in the appendent Claims.

What is claimed is:

1. A scroll type compressor which comprises in combination:

a bearing support having guide grooves extending in the diametral direction and an oil returning passage opening in the axial direction;

a stationary scroll member having a spiral wrap and fixed on said bearing support;

an orbiting scroll member having a spiral wrap which is combined with the spiral wrap of said stationary scroll member and guide grooves extending in the direction perpendicular to the direction of extension of said guide grooves of said bearing support;

an annular thrust bearing interposed between said orbiting scroll member and said bearing support, and having a multitude of oil feeding passages, each communicatively connected with said oil returning passage; and an Oldham coupling disposed on and around said thrust bearing and having claws which slide in and along said both guide grooves, wherein each said oil feeding passage is so formed as to have a terminal part within a plane of said thrust bearing, and a substantially circumferentially extending part of the passage is made to open at a position where it is intermittently communicating with said guide groove of said orbiting scroll member.

2. A scroll type compressor according to claim 1, wherein said oil feeding passage is provided therein with a throttle part.

3. A scroll type compressor according to claim 1, wherein said each oil feeding passage is in the form of a bent slit which is open to a center part of said thrust bearing.

4. A scroll type compressor according to claim 1, wherein said circumferentially extending part includes said terminal part.

5. A scroll type compressor according to claim 4, wherein each said oil feeding passage has a radially extending part connected between said oil returning passage and said circumferentially extending part.

* * * * *